(12) United States Patent
Basson et al.

(10) Patent No.: US 11,595,377 B2
(45) Date of Patent: Feb. 28, 2023

(54) METHOD AND SYSTEM FOR MONITORING FOR AND BLOCKING FRAUDULENT ATTEMPTS TO LOG INTO REMOTE SERVICES USING LIST VALIDATION ATTACKS

(71) Applicant: INTUIT INC., Mountain View, CA (US)

(72) Inventors: Or Basson, Tel Aviv (IL); Noah Eyal Altman, Hod HaSharon (IL); Yehezkel S. Resheff, Hod Hasharon (IL); Shir Meir Lador, Givat Shmuel (IL)

(73) Assignee: INTUIT INC., Mountain View, CA (US)

( * ) Notice: Subject to any disclaimer, the term of this patent is extended or adjusted under 35 U.S.C. 154(b) by 566 days.

(21) Appl. No.: 16/731,506

(22) Filed: Dec. 31, 2019

(65) Prior Publication Data

US 2021/0203651 A1 Jul. 1, 2021

(51) Int. Cl.
*H04L 29/06* (2006.01)
*H04L 9/40* (2022.01)
*G06N 20/00* (2019.01)

(52) U.S. Cl.
CPC .......... *H04L 63/083* (2013.01); *G06N 20/00* (2019.01); *H04L 63/102* (2013.01)

(58) Field of Classification Search
CPC . H04L 63/083; H04L 63/102; H04L 63/1441; G06N 20/00; G06N 7/005; G06F 21/554; G06F 21/556
See application file for complete search history.

(56) References Cited

U.S. PATENT DOCUMENTS

| 9,148,424 | B1 * | 9/2015 | Yang | H04L 63/083 |
| 10,909,235 | B1 * | 2/2021 | Farivar | G06F 21/46 |
| 2009/0077383 | A1 * | 3/2009 | de Monseignat | H04L 9/3242 713/176 |
| 2010/0186088 | A1 * | 7/2010 | Banerjee | G06F 21/56 709/224 |

(Continued)

OTHER PUBLICATIONS

Owen Lo, William J. Buchanan, Paul Griffiths, Richard Macfarlane "Distance Measurement Methods for Improved Insider Threat Detection" 2018, Hindawi (Year: 2018).*

*Primary Examiner* — Khalid M Almaghayreh
(74) *Attorney, Agent, or Firm* — Patterson + Sheridan, LLP

(57) ABSTRACT

Techniques for monitoring for fraudulent login attempts to remote services through an application. The method generally includes receiving a request to connect an application to a remote service. A login attempt counter tracking a number of attempts by a user to connect the application to one or more remote services is incremented. Based on determining that the login attempt counter is less than a maximum number of login attempts predicted to correspond to legitimate login activity in the application, the first username is compared to a second username included in a previous request. A distance is calculated between the first username and the second username, and one or more actions are taken to process the request based on determining whether the calculated distance exceeds a maximum predicted distance between usernames in successive requests that corresponds to legitimate login activity.

17 Claims, 5 Drawing Sheets

(56) References Cited

U.S. PATENT DOCUMENTS

| | | | |
|---|---|---|---|
| 2010/0293090 A1* | 11/2010 | Domenikos | G06Q 40/025 |
| | | | 705/325 |
| 2016/0226853 A1* | 8/2016 | Wall | H04L 63/1466 |
| 2017/0091450 A1* | 3/2017 | Turgeman | H04L 63/145 |
| 2017/0134362 A1* | 5/2017 | Randall | H04L 63/083 |
| 2018/0124082 A1* | 5/2018 | Siadati | G06N 5/047 |
| 2018/0302430 A1* | 10/2018 | Israel | G06Q 50/01 |
| 2019/0166112 A1* | 5/2019 | Gordon | H04L 63/083 |
| 2019/0384897 A1* | 12/2019 | Urmanov | H04L 63/0815 |
| 2020/0134165 A1* | 4/2020 | Boodaei | H04L 63/083 |
| 2020/0311231 A1* | 10/2020 | Levin | G06F 21/316 |
| 2020/0358798 A1* | 11/2020 | Maylor | H04L 63/1425 |
| 2020/0387592 A1* | 12/2020 | Hassan | G06F 21/36 |
| 2020/0396239 A1* | 12/2020 | Kaidi | H04L 63/1416 |
| 2021/0328969 A1* | 10/2021 | Gaddam | G06F 21/44 |

* cited by examiner

310 ▼

| Username | Password |
|---|---|
| obasson | 12345 |
| obasson | 12346 |
| obasson | 12344 |
| obasson | 12347 |

Number of Attempts = 4 > MAX_LEGIT_ATTEMPTS,
BUT credential username is identical:
Recognize Login Activity as Legitimate

320 ▼

| Username | Password |
|---|---|
| obasson | 12345 |
| orbasson | 12346 |
| obason | 12344 |
| obasson | 12347 |

Number of Attempts = 4 > MAX_LEGIT_ATTEMPTS,
BUT distance between pairs of credential usernames
is <= MAX_DISTANCE:
Recognize Login Activity as Legitimate

330 ▼

| Username | Password |
|---|---|
| obasson | 12345 |
| neyal | 12346 |
| obeeeec | 12344 |
| hezi | 12347 |

Number of Attempts = 4 > MAX_LEGIT_ATTEMPTS
AND distance between pairs of credential usernames
is > MAX_DISTANCE:
Recognize Login Activity as Fraudulent

FIG. 3

METHOD AND SYSTEM FOR MONITORING FOR AND BLOCKING FRAUDULENT ATTEMPTS TO LOG INTO REMOTE SERVICES USING LIST VALIDATION ATTACKS

INTRODUCTION

Aspects of the present disclosure generally relate to user authentication, and more specifically to preventing fraudulent attempts to log into remote services using list validation or other mass data entry attacks.

BACKGROUND

Many applications provide functionality for allowing users to connect to a service to interact with data maintained by the service. For example, in an accounting application, the application may expose login mechanisms to synchronize with, commit data to, and pull data from account records maintained by one or more external services. In another example, in an application that aggregates data from various controls systems, the application may expose login mechanisms to allow for data input/output and command transmission between the application and the external controls systems.

Generally, to connect an application with an external service, an application may transmit a request to connect with the external service including user credentials that identify the user account to log into. Typically, in response, the application may receive a response indicating whether the request to connection with the external service was successful or was unsuccessful. A successful response generally allows a user to continue to interact with the external service, while an unsuccessful response may indicate an error encountered during the attempt to interact with the service. For example, if user credentials are incorrect, the application may receive a response indicating that the login attempt failed and, in some embodiments, an indication of (1) whether the username exists, and (2) if the username exists, whether the password was incorrect. In response, a user may attempt to connect with the external service using different user credentials.

In some cases, user account credentials may be compromised and available for purchase in a list of compromised user account credentials. The list may include user account credentials with significantly different usernames (i.e., representing different users of a service), and some of the user account credentials may not work when a purchaser of such a list attempts to log into the service using any particular credential in the list of compromised user account credentials. Services may be set up to lock an account from access when a threshold number of incorrect credentials are used in an attempt to access a particular user's account for that service. However, because credentials in a list of compromised account credentials may not implicate the same user's account for that threshold number of attempts, owners of such lists may attempt to connect to the service sequentially using each credential in the list of compromised account credentials.

Accordingly, techniques are needed to mitigate security risks from login attempts generated from collections of compromised user account credentials.

BRIEF SUMMARY

Certain embodiments provide a computer-implemented method for monitoring for fraudulent login attempts to remote services through an application. The method generally includes receiving a request to connect an application to a remote service. The request generally includes a user identifier, a first username and a first password. A login attempt counter tracking a number of attempts by a user associated with the user identifier to connect the application to one or more remote services is incremented. Based on determining that the login attempt counter is less than a maximum number of login attempts predicted to correspond to legitimate login activity in the application, the first username is compared to a second username included in a previous request to connect the application to the remote service. Based on determining that the first username is different from the second username, a distance is calculated between the first username and the second username, and one or more actions are taken to process the request to connect the application to the remote service based on determining whether the calculated distance between the first username and the second username exceeds a maximum predicted distance between usernames in successive requests that corresponds to legitimate login activity in the application.

Other embodiments provide a system comprising a processor and a non-transitory computer-readable memory storing instructions that, when executed by the processor, perform an operation for monitoring for fraudulent login attempts to remote services through an application. The operation generally includes generally includes receiving a request to connect an application to a remote service. The request generally includes a user identifier, a first username and a first password. A login attempt counter tracking a number of attempts by a user associated with the user identifier to connect the application to one or more remote services is incremented. Based on determining that the login attempt counter is less than a maximum number of login attempts predicted to correspond to legitimate login activity in the application, the first username is compared to a second username included in a previous request to connect the application to the remote service. Based on determining that the first username is different from the second username, a distance is calculated between the first username and the second username, and one or more actions are taken to process the request to connect the application to the remote service based on determining whether the calculated distance between the first username and the second username exceeds a maximum predicted distance between usernames in successive requests that corresponds to legitimate login activity in the application.

Still further embodiments provide a computer-readable medium having instructions stored thereon which, when executed, performs an operation for monitoring for fraudulent login attempts to remote services through an application. The operation generally includes generally includes receiving a request to connect an application to a remote service. The request generally includes a user identifier, a first username and a first password. A login attempt counter tracking a number of attempts by a user associated with the user identifier to connect the application to one or more remote services is incremented. Based on determining that the login attempt counter is less than a maximum number of login attempts predicted to correspond to legitimate login activity in the application, the first username is compared to a second username included in a previous request to connect the application to the remote service. Based on determining that the first username is different from the second username, a distance is calculated between the first username and the second username, and one or more actions are taken to process the request to connect the application to the remote service based on determining whether the calculated distance between the first username and the second username exceeds a maximum predicted distance between usernames in successive requests that corresponds to legitimate login activity in the application.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates example sequences of user account credentials used to connect an application to an external service and indications of whether each sequence corresponds to legitimate or fraudulent behavior.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
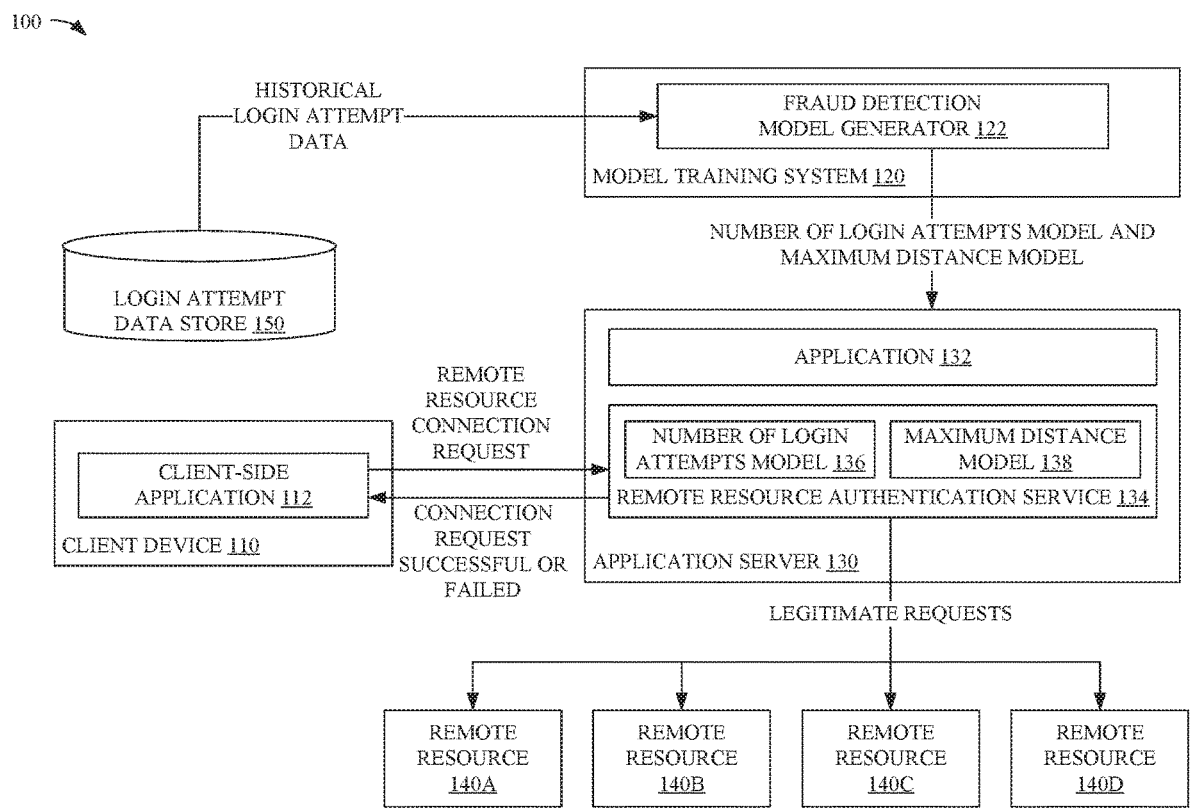
FIG. 1 depicts an example computing environment in which fraudulent login activity is monitored and blocked.

Aspects of the present disclosure provide apparatuses, methods, processing systems, and computer readable mediums for monitoring for fraudulent login attempts to remote services using predictions of a maximum number of login attempts and a maximum amount of change between usernames in successive attempts. Generally, legitimate requests may be represented a small number of attempts to log into an external service and small changes to the characters included in a username, while potentially fraudulent requests may be represented as a larger number of attempts to log into an external service and/or larger changes to the characters included in a username.

In some embodiments, the predicted maximum number of unsuccessful login attempts and the predicted maximum amount of change between usernames specified in successive login attempts may be determined based on machine learning models trained over training data sets of login history data captured by an application. Generally, because users may be assumed to use the same or similar credentials across a plurality of accounts (many of which may be unrelated to each other) and may be assumed to maintain accounts with a limited number of external services, a system may recognize a small number of attempts to login to a service as legitimate. Further, based on this assumption that users maintain accounts with the same or similar usernames, embodiments presented herein may recognize smaller changes between the username identified in successive requests as representing variations of a username; meanwhile, significant changes between successive usernames may be identified as potentially fraudulent (e.g., part of a list validation attack) based on the assumption that users maintain accounts with the same or similar usernames.

By using predicted maximum unsuccessful login attempts and predicted maximum numbers of changes to usernames specified in successive login attempts, embodiments presented herein may identify and curtail potentially fraudulent attempts to remotely access accounts maintained by other external services. An application may detect that a user is using a list validation attack to attempt to connect a large number of unrelated accounts at external services (e.g., accounts for different users at the same or different external services) to a user profile in the application and take action to prevent the user from adding accounts for these external services to the user's profile in the application. Further, the application may detect when a user is potentially using list validation attacks to user accounts at external services to the user's profile in the application and may take action to preserve the security of accounts in a list of compromised accounts by blocking the user from adding additional external service accounts, thereby preserving the security of other account credentials that may be included in a list of compromised account credentials.

As discussed in further detail herein, embodiments of the present disclosure may be used to solve a technical problem in authenticating and connecting with external services through an application. In some cases, external services that enforce various security measures in logging into the service through the service's website may not enforce these security measures when allowing applications to connect to the external service. In other cases, external services may enforce various security measures in respect of a particular username (e.g., login attempt limits), but may not enforce these security measures across different usernames. Thus, malicious users may be able to attempt a large number of login attempts using different username/password combinations while bypassing security measures implemented on the external services. Using trained machine learning models to predict a number of attempts to add accounts associated with legitimate use of an application and a distance between different usernames associated with legitimate use of an application, embodiments presented herein may introduce security measures to defeat avenues of attack that may not be detected by an external service. For example, in a list validation attack in which a list of compromised credentials are used serially to authenticate with an external service, embodiments presented herein may detect that a user is engaged in fraudulent activity based on the number of login attempts invoked and differences between usernames in login attempts. When a user is determined to be engaged in fraudulent activity, measures may be taken to prevent the user from attempting further fraudulent activity.

Example Processing of Resource Connection Requests Based on Request History and Usernames Included in Successive Requests FIG. 1 illustrates a computing environment 100 in which embodiments described herein may be implemented. In particular, computing environment 100 includes an example fraud detection system configured to predict a maximum number of login attempts and a maximum difference between usernames in successive login attempts to determine whether login attempts generated by a user of an application are legitimate or potentially fraudulent.

In this example, computing environment 100 includes a client device 110, a model training system 120, an application server 130, a plurality of remote resources 140, and a login attempt data store 150. Computing environment 100 illustrates the generation of predicted maximum numbers of login attempts and maximum differences between usernames in successive login attempts corresponding to legitimate activity in an application and the use of these generated predictions to identify potentially fraudulent activity by a user of the application. It should be recognized, however, that the generation of predicted maximum numbers of login attempts and maximum differences between usernames in successive login attempts corresponding to legitimate activity in an application and use of these predicted maximums may be performed on a client device.

Client device 110 generally hosts a client-side application 112 that receives graphical user interface data from application server 130. The graphical user interface data received from application server 130 may include one or more fields in which a user of an application hosted on application server 130 can enter user account credentials for use in connecting the application to a remote resource 140. Client-side application 112 may transmit a request to application 132 executing on application server 130 to connect application 132 to a remote resource 140 using the specified user account credentials. In response, client-side application 112 may receive a response that indicates whether the request to connect the application 132 with the remote resource 140 was successful. If the request was unsuccessful, the response may include information indicating whether an account associated with the specified username was found and/or whether an incorrect password was provided for the user account. If an attempt to connect the application 132 executing on application server 130 with a remote resource 140 fails, a user can attempt to connect to the remote service using different credentials (e.g., a different username and/or different password).

Model training system 120 generally represents a system on which machine learning models may be trained and deployed to an application server 130 for use. As illustrated, model training system 120 includes a fraud detection model generator 122.

Fraud detection model generator 122 is generally configured to use historical login attempt data and information about known fraudulent activity to generate two models (e.g., number of login attempts model 136 and maximum distance model 138) used by remote resource authentication service 134 to determine whether a user is potentially engaging in fraudulent activity by attempting to connect the user's profile with accounts owned by other users (e.g., using a list validation attack in which the user attempts to connect with remote resources 140 using sequential requests generated from a list of compromised user account credentials). A first model may be used to predict a maximum number of login attempts that corresponds to legitimate activity (beyond which activity may be assumed to correspond to potentially fraudulent activity). A second model may be used to predict a maximum difference between usernames specified in successive login attempts that corresponds to legitimate activity.

To generate the first model used to predict a maximum number of login attempts that corresponds to legitimate activity (hereinafter a "number of login attempts predictive model"), fraud detection model generator 122 can generate a first training data set including information about a number of login attempts associated with an application user account for the application hosted on application server 130 associated with a label indicating whether the application user account is associated with legitimate or fraudulent activity. To generate the training data set, fraud detection model generator 122 can retrieve historical login activity from login attempt data store 150 that includes a plurality of login records. Each login record in the plurality of login records may include an identifier of the application user account associated with a login request, a timestamp of a login request, a username included in the login request, a password included in the login request, and an identification of the remote resource 140 that is the target of the login request. For each application user account, the total number of login attempts may be aggregated from the individual records associated with the application user account. External information indicating whether the application user account is associated with fraudulent activity may be appended to the record.

Fraud detection model generator 122 then uses the generated first training data set to generate the number of login attempts predictive model, which predicts a maximum number of login attempts that can be performed by an application user account before the application user account is deemed to be associated with fraudulent activity. The number of login attempts predictive model may be, in some embodiments, a linear regression model or a logistic regression model.

In some embodiments, fraud detection model generator 122 can deploy the number of login attempts predictive model to remote resource authentication service 134 for use. In some embodiments, fraud detection model generator 122 can iterate through different numbers of login attempts to identify a maximum number of login attempts that a user associated with an application user account can perform before the application user account is identified as engaging in potentially fraudulent activity. For example, fraud detection model generator 122 can step through successive numbers of login attempts in the number of login attempts predictive model by requesting a prediction from the login attempts predictive model of whether a number of login attempts is indicative of legitimate or potentially fraudulent activity. When the number of login attempts predictive model generates a prediction that a given number of login attempts is potentially fraudulent, fraud detection model generator 122 can select the largest number of login attempts predicted to be indicative of legitimate activity as a threshold value and deploy the threshold value to remote resource authentication service 134 for use. More generally, when the number of login attempts predictive model predicts that n login attempts is indicative of legitimate activity and n+1 login attempts is indicative of potentially fraudulent activity, fraud detection model generator 122 can choose n as the maximum number of login attempts that a user can perform within an application before the application user account associated with the user is identified as engaging in potentially fraudulent activity.

To generate the second model used to predict a maximum distance between usernames specified in successive login attempts that corresponds to legitimate activity (hereinafter a "maximum distance predictive model"), fraud detection model generator 122 can generate a second training data set including information about the distance between successive login attempt generated by users of an application hosted on application server 130. Each record in the second training data set may include the calculated distance between usernames in successive login attempts and a tag indicating whether the record reflects fraudulent or legitimate activity by the application user account associated with the record.

For example, fraud detection model generator 122 can generate the training data set by obtaining login activity associated with each application user account from login attempt data store 150. For each pair of successive records in the login attempt data store 140 (i.e., the $i^{th}$ and $i+1^{th}$ record in the training data set associated with the application user account), fraud detection model generator 122 can calculate a distance between the usernames identified in the pair of successive records.

In one embodiment, the distance between usernames used in successive login attempts may be calculated as a Levenshtein distance between a username in a first attempt and a username in a second attempt. The distance generally indicates a number of changes that are to be performed against the username in the first attempt to result in the username in the second attempt. Further, the calculated distance between usernames in the pair of successive attempts may be labeled or otherwise associated with external information indicating whether the application user account is associated with fraudulent activity.

Fraud detection model generator 122 then uses the generated second training data set to generate the maximum distance predictive model, which identifies a maximum distance between usernames identified in successive login attempts that may exist before the application user account is deemed to be associated with fraudulent activity. The maximum distance predictive model may be, in some embodiments, a linear regression model or a logistic regression model.

In some embodiments, fraud detection model generator 122 can deploy the maximum distance predictive model to remote resource authentication service 134 for use. In some embodiments, fraud detection model generator 122 can iterate through different distances to identify a maximum distance between usernames in successive login requests that may be considered to be legitimate activity based on predictions made by the maximum distance predictive model. For example, fraud detection model generator 122 can step through successive distances in the maximum distance predictive model by requesting a prediction from the maximum distance predictive model of whether a given distance between usernames in successive login attempts is indicative of legitimate or potentially fraudulent activity. When the maximum distance predictive model generates a prediction that a given distance between usernames in successive login attempts is potentially fraudulent, fraud detection model generator 122 can select the largest distance predicted to be indicative of legitimate activity as a threshold value and deploy the threshold value to remote resource authentication service 134 for use.

More generally, when the maximum distance predictive model predicts that a distance of m characters between usernames in successive login attempts is indicative of legitimate activity and a distance of m+1 between usernames in successive login attempts is indicative of potentially fraudulent activity, fraud detection model generator 122 can choose m as the maximum legitimate distance between usernames in successive login attempts such that a distance greater than m is identified as fraudulent activity.

Application server 130 generally hosts various components of a software application that interfaces with services provided by one or more remote resources 140 to retrieve data from, commit data to, and otherwise perform operations on the remote resources 140. As illustrated, application server 130 includes an application 132 and a remote resource authentication service 134.

Application 132 is generally representative of a server-side application that client-side application 112 interacts with to perform various actions. Generally, application 132 may receive user input and data for processing from client-side application 112 and may perform various operations based on the received user input and data. Application 132 may also use external service credentials provided by a user to attempt to connect to an external service and perform operations in respect of the external service, subject to whether a user of application 132 is determined by remote resource authentication service 134 to be engaged in potentially fraudulent activity.

Remote resource authentication service 134 generally receives requests from a client device 110 to connect an application 132 with one or more remote resources 140 and uses the predictive models generated by fraud detection model generator 122 to determine whether a request corresponds to legitimate or potentially fraudulent activity (e.g., login requests generated from a list of compromised user credentials for user accounts associated with a remote resource 140).

Generally, remote resource authentication service 134 receives a remote resource connection request that initiates a process of determining whether the request is legitimate or potentially fraudulent activity. The remote resource connection request may identify a specific remote resource 140 as the resource to connect with the application 132 and include login credentials for the identified remote resource.

In response to receiving the remote resource connection request, remote resource authentication service 134 increments a login attempt counter associated with the user account of the user that instantiated the remote resource connection request. In some embodiments, the login attempt counter may be, for example, a session-based counter that is reset each time a user logs out of and then logs back into the user's account for the application 132 executing on application server 130. In some embodiments, the login attempt counter may maintain a running count of login attempts over a specified time window (e.g., a week, a month, a quarter, etc.). In some embodiments, the login attempt counter may be a lifetime counter that is associated with the user of the application 132 hosted on application server 130.

After incrementing the login attempt counter, remote resource authentication service 134 predicts whether the number of login attempts performed by the user corresponds to legitimate or probable fraudulent activity based on the number of login attempts model 136 generated by fraud detection model generator 122, as discussed above. In some embodiments, remote resource authentication service 134 can compare the value of the login attempt counter with a maximum number of login attempts associated with legitimate activity determined using the number of login attempts model to determine whether the received request corresponds to legitimate activity. In some embodiments, remote resource authentication service 134 can request a prediction, from number of login attempts model 136, of whether the number of login attempts performed by a user corresponds to legitimate activity from the number of login attempts predictive model. If the value of the login attempt counter is determined to correspond to legitimate activity, remote resource authentication service 134 can forward the connection request to the identified remote resource 140 for execution.

Otherwise, if the value of the login attempt counter is determined to correspond to potentially fraudulent activity, remote resource authentication service 134 can further examine details of the current and previous login request to determine whether the user that generated the remote resource connection request is engaging in fraudulent activity (e.g., attempting to connect to remote resources using a list validation attack based on a list of compromised user credentials for one or more remote resources 140). To determine whether the received remote resource connection request corresponds to fraudulent activity, remote resource authentication service 134 can calculate a distance between the username included in the received remote resource connection request and the username included in a previous remote resource connection request generated by the user of the application 132. The calculated distance may represent the number of changes that need to be performed against the username included in the previous remote resource connection request to result in the username included in the received remote resource connection request.

Using the calculated distance, remote resource authentication service 134 determines if the received request corresponds to potentially fraudulent activity. In some embodiments, remote resource authentication service 134 can compare the calculated distance to a maximum distance for legitimate activity identified from the maximum distance model. In some embodiments, remote resource authentication service 134 may request a prediction of whether the calculated distance corresponds to legitimate or potentially fraudulent activity. If the calculated distance exceeds the maximum distance for legitimate activity, remote resource authentication service 134 can determine that the received remote resource connection request corresponds to potentially fraudulent activity. Otherwise, if the calculated distance is less than or equal to the maximum distance corresponding to legitimate activity, remote resource authentication service 134 can forward the connection request to the identified remote resource 140 for execution.

Generally, after forwarding legitimate requests to the remote resources 140 for execution, remote resource authentication service 134 may receive a response from the remote resources 140 indicating whether or not the connection request was successful. Remote resource authentication service 134 can transmit an indication of whether the connection request was successful or unsuccessful to client device 110 for display in client-side application 112. In some embodiments, the response received from a remote resource 140 and included in the indication transmitted to client device 110 may indicate a general failure to authenticate using the specified credentials, whether the username included in the remote resource connection request was found, and/or whether the password included in the remote resource connection request was correct.

In some embodiments, if remote resource authentication service 134 determines that a user account is associated with potentially fraudulent activity, remote resource authentication service 134 can take one or more actions to block the user from connecting the user's account for the application 132 executing on application server 130 with remote resources 140 using fraudulently obtained credentials. For example, remote resource authentication service 134 may temporarily or permanently disable the user's account, blocking the user from using the application 132 executing on application server 130. In another example, remote resource authentication service 134 may temporarily or permanently disable the user's ability to connect the application 132 executing on application server 130 with remote resources 140.

Remote resources 140 are generally representative of external resources that can interface with an application 132 executing on application server 130 to allow for data exchange between application server 130 and remote resources 140 and the execution of specified operations on remote resources 140. Generally, remote resources 140 may expose a login gateway that processes connection requests received from remote resource authentication service 134 and returns an indication of whether the connection request was successful or failed.

Figure 2:
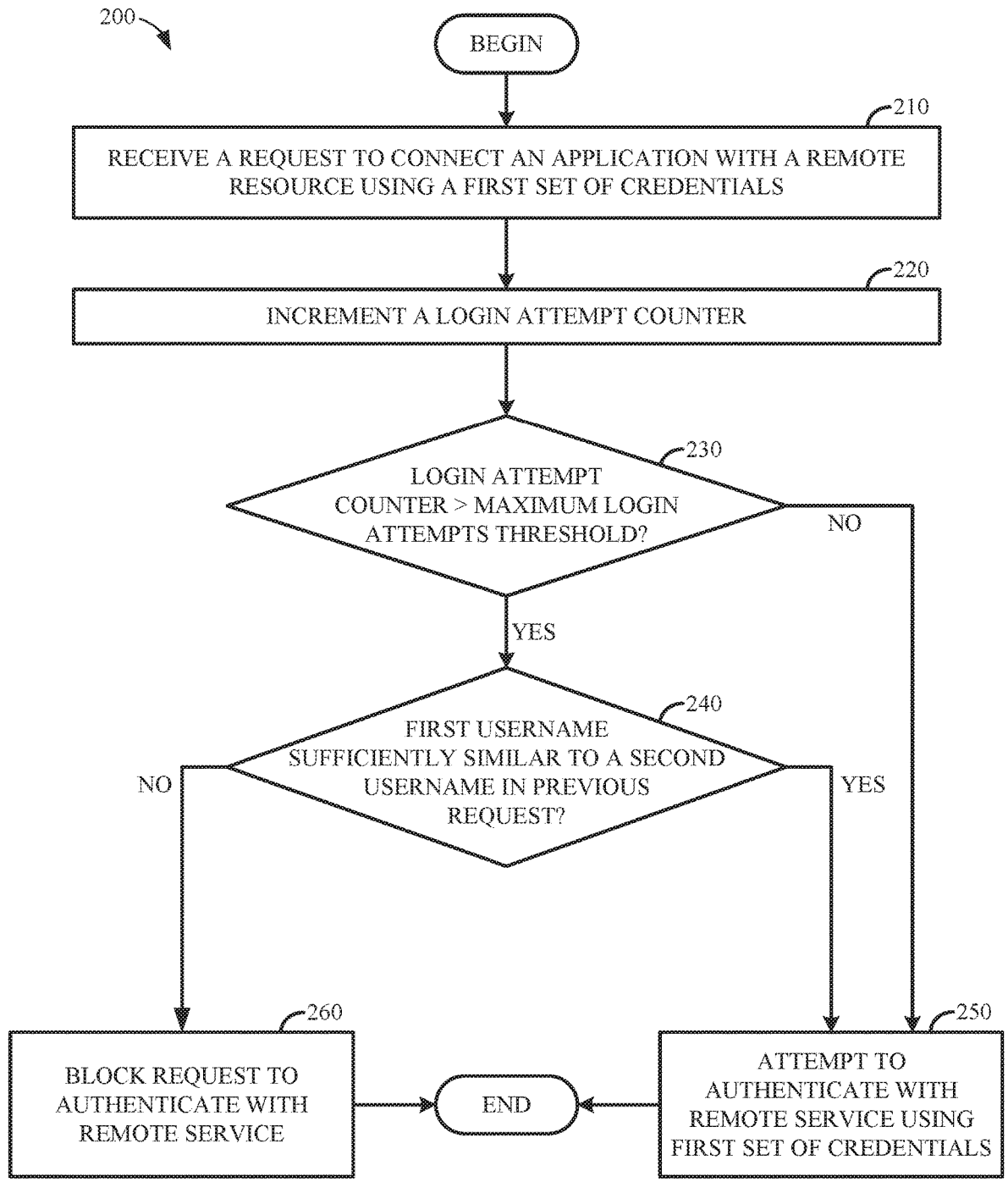
FIG. 2 illustrates example operations for monitoring for fraudulent login attempts to connect an application with an external service.

Example Processing of Resource Connection Requests Based on Request History and Usernames Included in Successive Requests FIG. 2 illustrates example operations 200 for monitoring for and blocking fraudulent requests to connect an application with a remote resource based on request history and usernames included in successive requests. The operations described herein may be performed on an application server hosting a software application (e.g., application server 130 illustrated in FIG. 1) or on a client device on which a self-contained application is installed (e.g., client device 110 illustrated in FIG. 1).

As illustrated, operations 200 begin at block 210, where a system receives a request to connect a software application with a remote resource using a first set of credentials. The request may be associated with a user account for the application, and the first set of credentials may include at least a username and password for a user account on the remote resource.

At block 220, the system increments a login attempt counter. As discussed, the login attempt counter may track a number of times the user associated with the user account has attempted to connect the software application with a remote resource. The counter may be maintained on a per-session basis, for a specified time period, or for the lifetime of the user account.

At block 230, the system determines whether the login attempt counter exceeds a maximum number of login attempts threshold value. In some embodiments the maximum number of login attempts threshold value may be a value associated with legitimate activity within the software application. As discussed, the maximum number of login attempts threshold value may be determined based on a predictive model trained using known sequences of login activity associated with legitimate and fraudulent login activity. The maximum number of login attempts threshold value may be, for example, the largest number of login attempts determined by the predictive model to correspond to legitimate activity and may be smaller than the smallest number of login attempts determined by the predictive model to correspond to potentially fraudulent activity.

If, at block 230, the system determines that the login attempt counter does exceed the maximum number of login attempts threshold value, operations 200 may proceed to block 240. At block 240, the system determines if the first username is sufficiently similar to a second username included in a previous request to connect the application with the remote resource. If the system determines that the first username is sufficiently similar to the second username, then at block 250, the system attempts to authenticate with the remote service using the first set of credentials.

Otherwise, the system determines that the first username is not sufficiently similar to the second username, and operations 200 proceed to block 260. At block 360260, the system blocks the request to authenticate with the remote service.

In some embodiments, the system may drop the request to authenticate with the remote service and transmit an error message to the requesting client device. In some embodiments, the system may take one or more actions to prevent the user that generated the request from generating subsequent requests to authenticate with remote services. For example, the system may disable the user account for a period of time or permanently, blocking the user associated with the user account from using the software application. In another example, the system may disable certain features of the software application for the user associated with the user account.

In some embodiments, the system can block execution of the request to connect the application to the remote service based on determining that the login attempt counter exceeds a maximum number of login attempts predicted to correspond to legitimate login activity in the application.

In some embodiments, the system can determine that the calculated distance between the first username and the second username exceeds the maximum predicted distance. The system may block execution of the request based on the determination that the calculated distance between the first username and the second username exceeds the maximum predicted distance.

In some embodiments, the system can determine that the calculated distance between the first username and the second username is less than the maximum predicted distance. The system may forward the request to the remote service for execution based on the determination that the calculated distance between the first username and the second username is less than the maximum predicted distance.

In some embodiments, the maximum number of login attempts predicted to correspond to legitimate login activity in the application may be determined by obtaining, from an application log, a historical connection request data set. Each connection request in the historical connection request data set may include at least user identifier information, username information, and remote service identification information. The system can generate a training data set by augmenting the obtained historical connection request data set with information about requests to connect an application to remote services known to be fraudulent. The system can train a machine learning model based on the training data set to predict a maximum number of attempts to connect the application to the remote service that corresponds to legitimate login activity. In some embodiments, the machine learning model comprises a linear regression model.

In some embodiments, the maximum predicted distance between usernames in successive requests that corresponds to legitimate login activity in the application may be determined by generating a training data set of distances between usernames included successive login attempts associated with a user identifier in the application. The system can augment the training data set with information about requests to connect an application to remote services known to be fraudulent. A machine learning model may be trained based on the augmented training data set to predict a maximum distance between usernames included in successive requests that corresponds to legitimate login activity. In some embodiments, the machine learning model comprises a linear regression model. In some embodiments, a distance between usernames comprises a number of character edits to a username included in a first login attempt needed to result in a username included in a second login attempt.

Example Remote Resource Connection Request Activity

FIG. 3 illustrates example sequences of remote resource connection request activity that may be determined to be legitimate or fraudulent by an authentication service (e.g., remote resource authentication service 134 illustrated in FIG. 1).

As discussed above, determinations of whether a sequence of connection requests corresponds to legitimate or fraudulent activity may be based on modeled predictions about typical behavior by users of an application. These assumptions may include an assumption that typical users of the application have a number of accounts on remote resources that is less than some maximum number and that typical users use similar usernames for their accounts on each of the remote resources. Where a sequence of events conforms to these assumptions, an authentication service may determine that the sequence corresponds to legitimate activity, and where a sequence of events does not conform to these assumptions the authentication service may determine that the sequence corresponds to fraudulent activity.

In each of the sequences illustrated in FIG. 3, the number of login attempts included in a sequence exceeds the threshold number of login attempts that corresponds to legitimate activity. Generally, as discussed herein, determinations of whether login attempts are potentially fraudulent activity may be performed once the number of login attempts performed by a user exceeds a threshold number of attempts. Before the number of login attempts exceeds the threshold number of login attempts, the system can assume that a user is engaged in legitimate activity. Generally, determinations of whether user activity in respect of attempts to connect an application with external services may be based on the following logic table:

| Number of Attempts > Number of Attempts Threshold | Distance > Maximum Distance Threshold | Legitimate or Fraudulent? |
| --- | --- | --- |
| F | — | Legitimate |
| T | F | Legitimate |
| T | T | Fraudulent |

Sequence 310 illustrates an example sequence of login attempts that is determined to correspond to legitimate activity, even though the number of attempts exceeds a maximum number of attempts corresponding to legitimate activity. In this example, the username included in the login credentials is identical for each of the entries in the sequence of login attempts (i.e., the Levenshtein distance between the username included any pair of sequential login attempts is 0). Because the username is the same in each of these login attempts, the system can determine that the sequence of login attempts corresponds to legitimate activity and that the sequence may have been caused, for example, by the user forgetting which password to use to log into a remote resource. Thus, an authentication service may forward the requests to the identified remote resource for processing.

Sequence 320 illustrates another example sequence of login attempts that is determined to correspond to legitimate activity, even though the number of attempts exceeds a maximum number of attempts corresponding to legitimate activity. In this example, the username included in each login attempt is different from the username included in the previous login attempt. For example, the first login attempt may include the username "obasson", while the second login attempt may include the username "orbasson". The distance between the username in the first and second login attempts is 1, as the only character edit to be made to arrive at the username in the second login attempt is the addition of the character 'r'. Likewise, the distance between the username in the second and third login attempts is 2, representing the removal of the 'r' and one of the 's' characters from the username in the second login attempt; and the distance between the username in the third and fourth login attempts is 1, representing the addition of an 's' character to the username in the third login attempt. In this example, the distance between usernames in each pair of successive login attempts is less than a maximum distance between usernames associated with legitimate activity. Thus, the authentication service can determine the sequence of login attempts corresponds to legitimate activity and that the sequence may have been caused, for example, by the user forgetting which variation of a username to use to log into a remote resource. Based on this determination, an authentication service may forward the requests to the identified remote resource for processing.

Sequence 330 illustrates an example sequence of login attempts that is determined to correspond to fraudulent activity based on a number of login attempts exceeding a maximum number of login attempts corresponding to legitimate activity and distances between usernames exceeding a maximum distance corresponding to legitimate activity. As illustrated, the username included in a first login attempt is "obasson", while the username included in a second login attempt is "neyal". The distance between these two usernames is 7 characters, indicating that there is a large difference between the usernames in the first and second login attempts. Likewise, the username included in the third login attempt is "obeeeec", and the distance between the usernames in the second and third login attempts is 6 characters. Finally, the username included in the fourth login attempt is "hezi", and the distance between the usernames in the third and fourth login attempts is 6 characters. In each of these attempts, the distance may be determined to exceed a maximum distance associated with legitimate activity, and the authentication service can determine that the sequence of login attempts corresponds to fraudulent activity (e.g., login attempts generated from a list validation attack using a list of compromised user credentials). Thus, the authentication service may terminate the requests, generate a request failure message for the user without attempting to use the credentials to log into a remote resource, and take one or more actions to block the user of the application from attempting to connect to remote resources in the future.

Figure 4:
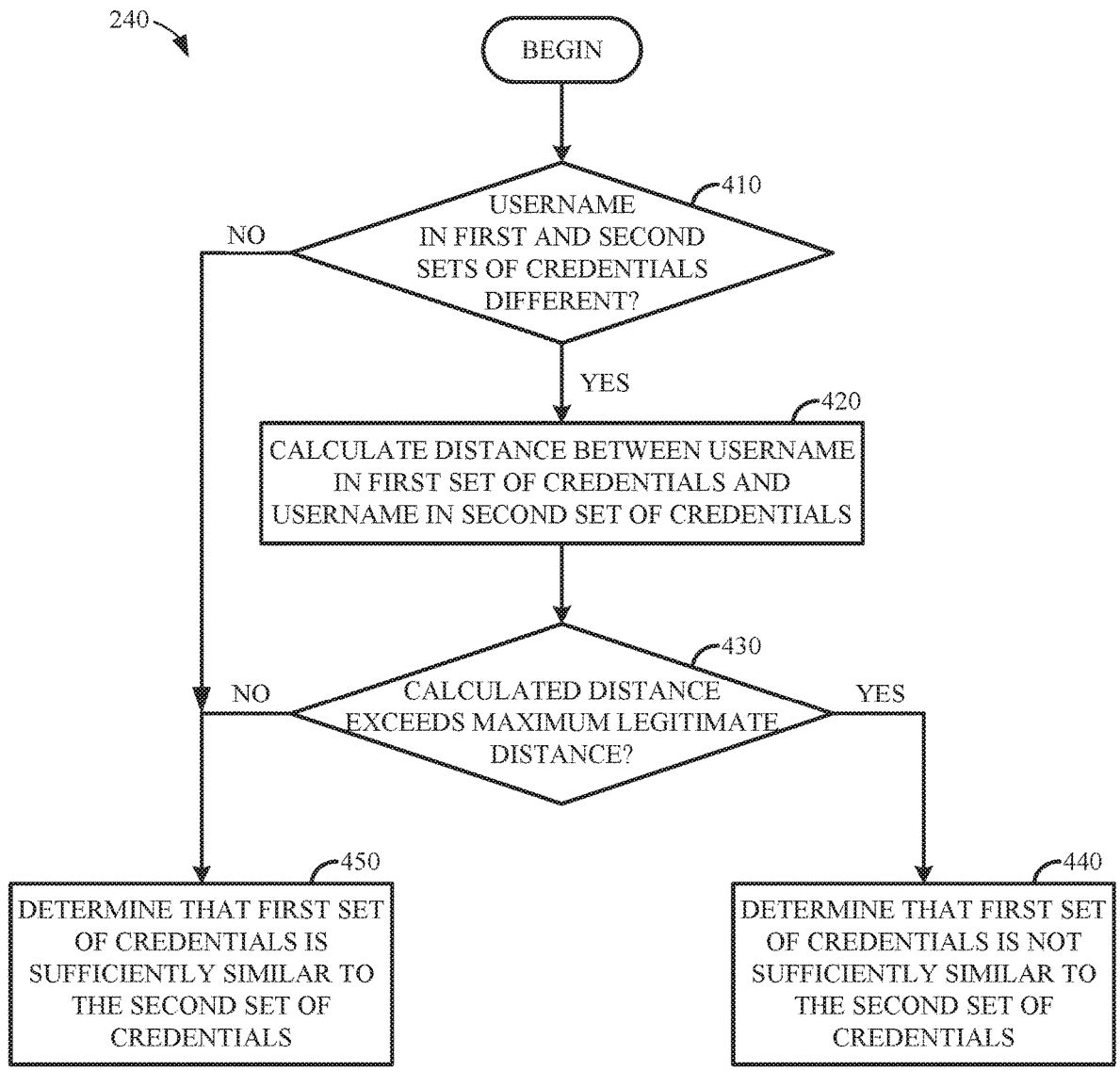
FIG. 4 illustrates example operations for determining whether successive login attempts with different usernames corresponds to potentially fraudulent activity.

Example Determination of Whether Usernames Included in Subsequent Requests are Sufficiently Similar FIG. 4 illustrates further details of example operations 240 (illustrated in FIG. 2) that may be performed to determine whether the first set of credentials included in a received request is sufficiently similar to a second set of credentials included in a previous request.

As illustrated, operations 340 begin at block 410, where the system determines if the username included in the first and second sets of credentials are different. Generally, the system can determine if the username included in the first and second sets of credentials are different using various character or string analysis techniques. In some embodiments, the system can use the Boolean output of a string comparison functions (e.g., String.Equals in string libraries used in many programming languages) to determine whether the username in the first and second sets of strings are the same. In some embodiments, the system can determine that the username in the first and second sets of credentials are different if the length of the username in the first and second sets of credentials are different or if at least one character in the username in the first and second sets of credentials is different.

If, at block 410, the system determines that the username in the first and second sets of credentials are different, then at block 420, the system calculates a distance between the username in the first set of credentials and the username in the second set of credentials. As discussed, to calculate the distance between usernames in the first and second sets of credentials, a system can identify edits, insertions, and deletions are to be made to characters in username in the first set of credential to result in the username in the second set of credentials.

At block 430, the system determines whether the calculated distance between the usernames in the first and second sets of credentials exceeds a maximum legitimate distance. The maximum legitimate distance may be a distance identified by a predictive model below which changes in usernames may be assumed to be representative of legitimate activity and above which changes in usernames may be assumed to be representative of potentially fraudulent activity.

If, at block 430, the system determines that the calculated distance between the usernames in the first and second sets of credentials exceeds the maximum legitimate distance, then at block 440, the system can determine that the first set of credentials is not sufficiently similar to the second set of credentials. As discussed above, the system can use this indication to determine that the user is potentially engaged in fraudulent activity, such as attempting to connect the user's account for a software application with remote resources using a list validation attack against a list of compromised credentials.

If, however, at block 430, the system determines that the calculated distance between the usernames in the first and second sets of credentials does not exceed the maximum legitimate distance, operations 340 may proceed to block 450. At block 450, the system determines that the first set of credentials is sufficiently similar to the second set of credentials. As discussed above, the system can use this indication to determine that the user is engaged in legitimate activity (i.e., the user may have forgotten which variation of a username to use to connect with a remote service) and may allow the user to continue with attempts to connect the application with the remote service.

If, at block 410, the system determines that the username included in the first and second sets of credentials are identical, operations 340 may also proceed to block 450. In such a case, the attempts to log into the remote service using the first and second sets of credentials may represent a scenario in which the user may have forgotten which password to use to connect with the remote service, and thus may not be indicative of potentially fraudulent activity within the software application.

Example Use Case

Assume that a situation exists where a remote resource does not perform security checks on attempts to connect a user account maintained by the remote resource with an application. In such a situation, the remote resource may be vulnerable to attacks, such as list validation attacks, in which a user of an application attempts to log into accounts maintained by the remote resource using a list of compromised user credentials. Because the remote resource does not perform security checks, a malicious user may use functionality connecting the application to the remote resource to identify valid and invalid account credentials and compromise the accounts associated with the valid account credentials. For example, in a banking-related application, where the remote resource allows users to perform transactions in respect of a bank account, a malicious user could determine which account credentials allow access to a user account and steal funds from these user accounts.

To prevent malicious users from performing fraudulent activity with respect to connecting an account to user accounts on a remote resource, the application can use the techniques described herein to block such fraudulent activity from being executed. Each time a user of the application enters a set of credentials to attempt to connect the application with a remote resource, the application can increment a counter of login attempts performed by the user. If the counter is less than a maximum number of login attempts identified by a predictive model as corresponding to legitimate activity, the application may attempt to connect with the remote resource using the provided credentials.

Otherwise, if the counter exceeds the maximum number of login attempts identified as corresponding to legitimate activity, the application can further examine the provided login credentials to determine whether to connect to the remote resource using the provided credentials. The application can calculate a distance between the username specified in the immediately preceding request to the username specified in the current request to connect the application to the remote resource. If the distance is 0, indicating that the username is identical, or if the distance is otherwise below a threshold difference value indicative of legitimate activity, the application can assume that the user is engaged in legitimate activity. For example, the user may have forgotten which variation of a username that was used for an account with the remote service, may have misspelled the username, or otherwise entered usernames that are sufficiently close to each other in successive requests. If, however, the distance exceeds the threshold difference value, the application can determine that the user is engaged in fraudulent activity (e.g., attempting to validate credentials of many different users in order to perform malicious actions in respect of these users' bank accounts or other personal accounts). The application may thus drop the request to connect the application with the remote resource using the provided user credentials. The application may further take action to prevent the user of the application from continuing with a list validation attack and taking any actions in respect of accounts that the user may have already connected to the application.

Figure 5:
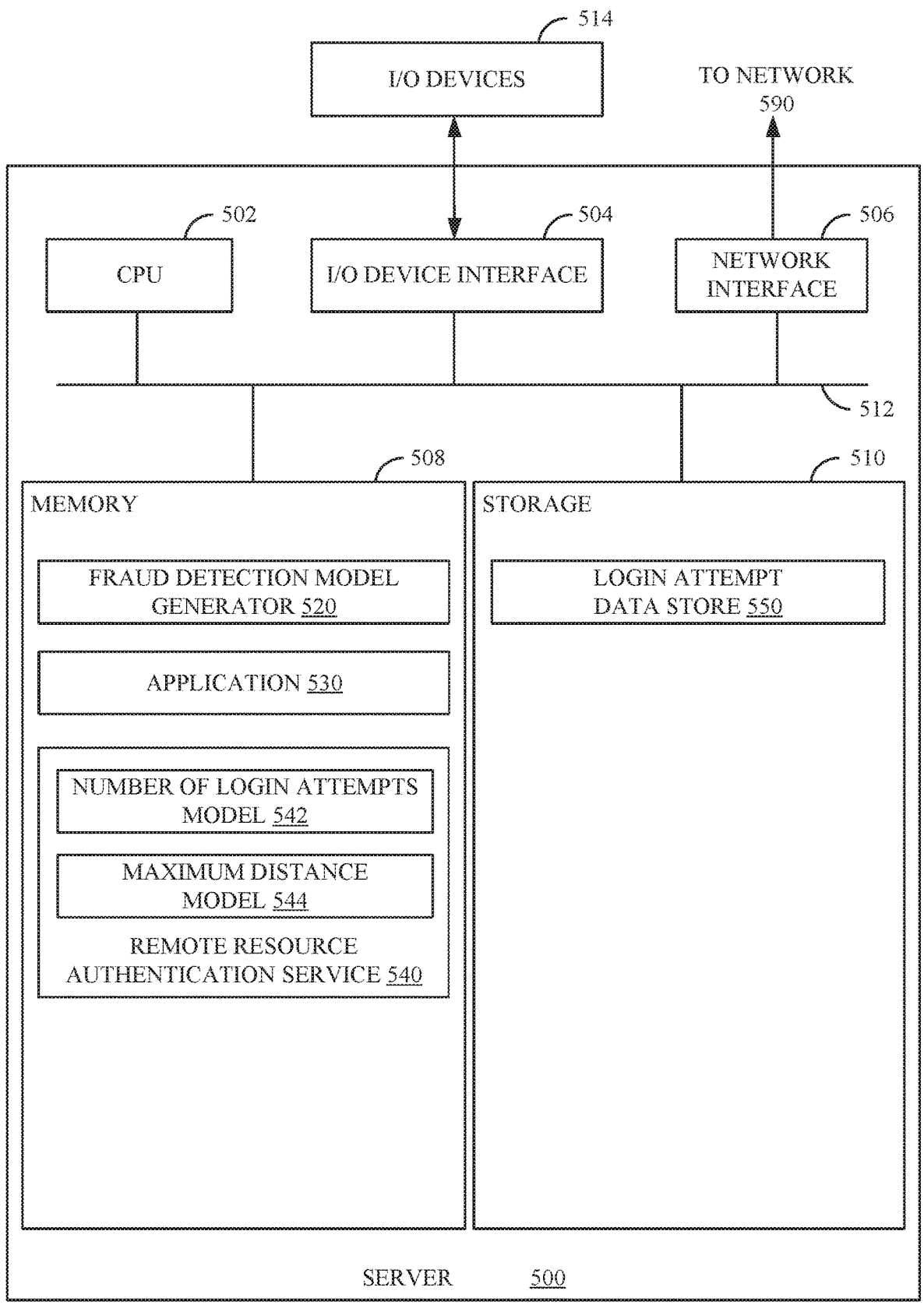
FIG. 5 illustrates an example computing system with which embodiments of the present disclosure may be implemented.

Example Systems for Processing of Resource Connection Requests Based on Request History and Usernames Included in Successive Requests FIG. 5 illustrates an example system 500 on which predictions of a maximum number of login attempts to connect an application with a service and a maximum difference between usernames in successive login attempts to connect the application with a service are used to determine whether login attempts generated by a user of the application are legitimate or potentially fraudulent. For example, system 500 may be representative of application server 130 illustrated in FIG. 1.

As shown, server 500 includes a central processing unit (CPU) 502, one or more I/O device interfaces 504 that may allow for the connection of various I/O devices 515 (e.g., keyboards, displays, mouse devices, pen input, etc.) to the server 500, network interface 506 through which server 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a fraud detection model generator 520, an application 530, and a remote resource authentication service 540. Fraud detection model generator 520 generally uses historical user requests to connect an application 530 with a remote resource to generate number of login attempts model 542 for predicting a maximum number of requests to connect the application with a remote resource corresponding to legitimate activity. Fraud detection model generator 520 also uses historical user requests to connect the application with a remote resource to generate maximum distance model 544 for predicting a maximum distance between usernames included in sequential requests corresponding to legitimate activity. Fraud detection model generator 530 generally deploys the generated models 542 and 544 to remote resource authentication service 540 for use in determining whether received requests correspond to legitimate or potentially fraudulent activity.

Application 530 generally represents a server-side application that uses information received from a client-side application and one or more remote services to perform various operations on the data.

Remote resource authentication service 540 generally receives requests to connect an application with a remote resource and uses models 542 and 544 generated by fraud detection model generator 520 to determine whether the received requests correspond to legitimate or potentially fraudulent activity. Generally, remote resource authentication service 540 can maintain a counter tracking a number of requests generated by a user to connect an application with a remote resource. If remote resource authentication service 540 determines that the counter of requests is less than a maximum number of requests identified by number of login attempts model 542 as corresponding to legitimate activity, remote resource authentication service 540 can dispatch the received request to the identified remote resource. Otherwise, remote resource authentication service 540 can examine the username included in the received request and the username included in a previous request and calculate a distance between these usernames. If the distance exceeds a maximum distance identified by maximum distance model 544 as corresponding to legitimate activity, the system can flag the request as potentially fraudulent and take one or more actions with respect to the application user account associated with these requests to block the user from generating subsequent requests. Otherwise, the system can dispatch the received request to the identified remote resource for processing.

Storage 510 is representative of a non-volatile memory, such as a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN). Storage 510, as illustrated, may include a login attempt data store 550. Login attempt data store 550 generally represents a data repository in which historical user activity and information about fraudulent activity may be stored. As discussed, fraud detection model generator 520 can use the information included in login attempt data store 550 to generate the training data sets used to train the first and second predictive models for identifying a maximum number of login attempts and a maximum distance between usernames in successive requests corresponding to legitimate activity, respectively.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for monitoring for fraudulent login attempts to remote services through an application, comprising:
   receiving a request to connect the application to a remote service, the request comprising a user identifier, a username and a password;
   incrementing a login attempt counter tracking a number of login attempts by a user associated with the user identifier to connect the application to the remote services; and
   based on determining that the login attempt counter exceeds a threshold number of login attempts, wherein the threshold number of login attempts is determined based on a predictive model trained to predict the threshold number of login attempts based on a training data set of numbers of login attempts correlated with indications of fraudulent or non-fraudulent activity and wherein the threshold number of login attempts corresponds to a maximum number of login attempts predicted to correspond to legitimate login activity in the application:
   comparing the username included in the request to a username included in a previous request by the user to connect the application to the remote service, and
   based on determining that the username included in the request is different from the username included in the previous request:
      calculating a distance between the username included in the request and the username included in the previous request, and
      taking one or more actions to process the request to connect the application to the remote service based on determining whether the calculated distance between the username included in the request and the username included in the previous request exceeds a threshold distance, the threshold distance being determined based on a predictive model trained to predict the threshold distance based on a training data set of distances between usernames in successive login attempts correlated with indications of fraudulent or non-fraudulent activity,
   wherein the threshold distance between usernames in successive requests that corresponds to legitimate login activity in the application is determined by:
      generating the training data set of distances between usernames included in the successive login attempts associated with the user identifier in the application;
      augmenting the training data set with information about requests to connect the application to the remote service known to be fraudulent; and
      training a first machine learning model based on the augmented training data set to predict the threshold distance that corresponds to a maximum distance between usernames included in successive requests that corresponds to legitimate login activity.

2. The method of claim 1, further comprising: based on determining that the login attempt counter is less than the threshold number of login attempts, executing the request to connect the application to the remote service without calculating the distance between the username in the request and the username in the previous request, wherein the login attempt counter tracks a total number of login attempts performed by the user over a total amount of time the user has used the application.

3. The method of claim 1, wherein:
   the calculated distance between the username in the request and the username in the previous request exceeds the threshold distance, and
   the taking one or more actions to process the request comprises dropping the request such that the request to connect the application with the remote service is not forwarded to the remote service for execution.

4. The method of claim 1, wherein:
   the calculated distance between the username in the request and the username in the previous request is less than the threshold distance;
   determining that the request corresponds to legitimate activity based on determining that the login attempt counter exceeds the threshold number of login attempts but that the calculated distance between the username in the request and the username in the previous request is less than the threshold distance; and
   the taking one or more actions to process the request comprises authenticating with the remote service based on the username and password in the request based on the determination that the request corresponds to legitimate activity.

5. The method of claim 1, further comprising:
based on a determination that the username in the request and the username in the previous request are identical:
   determining that the request corresponds to legitimate activity based on determining that the login attempt counter exceeds the threshold number of login attempts in the application but that the username in the request and the username in the previous request are identical, and
   authenticating with the remote service based on the username and password in the request based on the determination that the request corresponds to legitimate activity.

6. The method of claim 1, wherein the threshold number of login attempts is determined by:
   obtaining, from an application log, a historical connection request data set, each connection request in the historical connection request data set including at least user identifier information, username information, and remote service identification information;
   generating a training data set by augmenting the obtained historical connection request data set with information about requests to connect the application to the remote services known to be fraudulent; and
   training a second machine learning model based on the training data set to predict the maximum number of login attempts to connect the application to the remote service that corresponds to legitimate login activity.

7. A system, comprising:
a processor; and
a memory having instruction stored thereon which, when executed by the processor, performs an operation for monitoring for fraudulent login attempts to remote services through an application, the operation comprising:
   receiving a request to connect the application to a remote service, the request comprising a user identifier, a username and a password;
   incrementing a login attempt counter tracking a number of login attempts by a user associated with the user identifier to connect the application to the remote service; and
   based on determining that the login attempt counter exceeds a threshold number of login attempts, wherein the threshold number of login attempts is determined based on a predictive model trained to predict the threshold number of login attempts based on a training data set of numbers of login attempts correlated with indications of fraudulent or non-fraudulent activity and wherein the threshold number of login attempts corresponds to a maximum number of login attempts predicted to correspond to legitimate login activity in the application:
      comparing the username included in the request to a username included in a previous request by the user to connect the application to the remote service, and
      based on determining that the username included in the request is different from the username included in the previous request:
         calculating a distance between the username included in the request and the username included in the previous request, and
         taking one or more actions to process the request to connect the application to the remote service based on determining whether the calculated distance between the username included in the request and the username included in the previous request exceeds a threshold distance, the threshold distance being determined based on a predictive model trained to predict the threshold distance based on a training data set of distances between usernames in successive login attempts correlated with indications of fraudulent or non-fraudulent activity,
      wherein the threshold distance between usernames in successive requests that corresponds to legitimate login activity in the application is determined by:
         generating a training data set of distances between usernames included in successive login attempts associated with the user identifier in the application;
         augmenting the training data set with information about requests to connect the application to the remote service known to be fraudulent; and
         training a first machine learning model based on the augmented training data set to predict the threshold distance that corresponds to a maximum distance between usernames included in successive requests that corresponds to legitimate login activity.

8. The system of claim 7, wherein the operation further comprises: based on determining that the login attempt counter is less than the threshold number of login attempts, executing the request to connect the application to the remote service without calculating the distance between the username in the request and the username in the previous request, wherein the login attempt counter tracks a total number of login attempts performed by the user over a total amount of time the user has used the application.

9. The system of claim 7, wherein:
the calculated distance between the username in the request and the username in the previous request exceeds the threshold distance, and
the taking one or more actions to process the request comprises dropping the request such that the request to connect the application with the remote service is not forwarded to the remote service for execution.

10. The system of claim 7, wherein:
the calculated distance between the username in the request and the username in the previous request is less than the threshold distance;
determining that the request corresponds to legitimate activity based on determining that the login attempt counter exceeds the threshold number of login attempts but that the calculated distance between the username in the request and the username in the previous request is less than the threshold distance; and
the taking one or more actions to process the request comprises authenticating with the remote service based on the username and password in the request based on the determination that the request corresponds to legitimate activity.

11. The system of claim 7, further comprising:
based on a determination that the username in the request and the username in the previous request are identical:
   determining that the request corresponds to legitimate activity based on determining that the login attempt counter exceeds the threshold number of login attempts but that the username in the request and the username in the previous request are identical, and authenticating with the remote service based on the username and password in the request based on the determination that the request corresponds to legitimate activity.

12. The system of claim 7, wherein the threshold number of login attempts is determined by:
   obtaining, from an application log, a historical connection request data set, each connection request in the historical connection request data set including at least user identifier information, username information, and remote service identification information;
   generating a training data set by augmenting the obtained historical connection request data set with information about requests to connect the application to the remote services known to be fraudulent; and
   training a second machine learning model based on the training data set to predict the maximum number of login attempts to connect the application to the remote service that corresponds to legitimate login activity.

13. A method for monitoring for fraudulent login attempts to remote services through an application, comprising:
   receiving a request to connect the application to a remote service, the request including a user identifier, a username and a password;
   incrementing a login attempt counter tracking a number of login attempts by a user associated with the user identifier to connect the application to the remote services; and
   taking one or more actions to process the request based on predictions generated by a first machine learning model trained to predict whether a value of the login attempt counter is indicative of potentially fraudulent activity by predicting a threshold number of login attempts corresponds to a maximum number of login attempts to connect the application to the remote service that corresponds to legitimate login activity, and a second machine learning model trained to predict whether a difference between the username in the request and a username in a previous request is indicative of fraudulent activity,
   wherein the second machine learning model is trained to predict whether the difference between the username in the request and the username in the previous request is indicative of fraudulent activity based on predicting a threshold distance between usernames in successive requests that corresponds to legitimate login activity using a training data set of distances between usernames in successive login attempts correlated with indications of fraudulent or non-fraudulent activity,
   wherein the threshold distance between usernames in the successive requests that corresponds to legitimate login activity in the application is determined by,
      generating the training data set of distances between usernames included in the successive login attempts associated with the user identifier in the application;
      augmenting the training data set with information about requests to connect the application to the remote service known to be fraudulent; and
      training the second machine learning model based on the augmented training data set to predict the threshold distance that corresponds to a maximum distance between the usernames included in successive requests that corresponds to legitimate login activity.

14. The method of claim 13, wherein the taking one or more actions to process the request comprises authenticating the request to connect the application with the remote service using the username and password identified in the request based on a prediction by the first machine learning model that the value of the login attempt counter indicates that the request corresponds to legitimate activity.

15. The method of claim 13, wherein the taking one or more actions to process the request comprises authenticating the request to connect the application with the remote service using the username and password identified in the request based on a prediction by the first machine learning model that the value of the login attempt counter indicates that the request corresponds to potentially fraudulent activity and a prediction by the second machine learning model that the difference between the username in the request and the username in the previous request corresponds to legitimate activity.

16. The method of claim 13, wherein the taking one or more actions to process the request comprises dropping the request to connect the application with the remote service based on a prediction by the first machine learning model that the value of the login attempt counter indicates that the request corresponds to potentially fraudulent activity and a prediction by the second machine learning model that the difference between the username in the request and the username in the previous request corresponds to fraudulent activity.

17. The method of claim 13, wherein the first machine learning model is generated by:
   obtaining, from an application log, a historical connection request data set, each connection request in the historical connection request data set including at least user identifier information, username information, and remote service identification information;
   generating a training data set by augmenting the obtained historical connection request data set with information about requests to connect the application to the remote services known to be fraudulent; and
   training the first machine learning model based on the training data set to predict the maximum number of login attempts to connect the application to the remote service that corresponds to legitimate login activity.

* * * * *